United States Patent
Dreibelbis

[11] 3,891,124
[45] June 24, 1975

[54] MEANS FOR STORING AND DISPENSING HEATED LIQUID WITH EXPANSION CHAMBER MODULE AND SYSTEM THEREFOR

[75] Inventor: Richard C. Dreibelbis, Fair Lawn, N.J.

[73] Assignee: Emerson Electric Co., Cedar Grove, N.J.

[22] Filed: Aug. 16, 1974

[21] Appl. No.: 498,073

[52] U.S. Cl............ 222/66; 222/108; 222/146 HE; 219/306; 219/312
[51] Int. Cl............................ B67d 5/62; F24h 1/20
[58] Field of Search......... 222/108, 146 HE, 146 H, 222/109, 110, 66; 219/306, 312, 314; 137/207

[56] References Cited
UNITED STATES PATENTS

| | | | |
|---|---|---|---|
| 2,656,849 | 10/1953 | Deatrick et al. | 222/66 X |
| 3,003,659 | 10/1961 | Miller | 137/207 X |
| 3,381,110 | 4/1968 | Fischer | 219/312 |
| 3,444,883 | 5/1969 | Slaughter | 137/207 |
| 3,642,176 | 2/1972 | Dreibelbis et al. | 222/318 X |

*Primary Examiner*—Robert B. Reeves
*Assistant Examiner*—Frederick R. Handren
*Attorney, Agent, or Firm*—Daniel H. Bobis

[57] ABSTRACT

An expansion module preferably made of plastic material is dislcosed for use in a liquid heating and dispensing system operated at atmospheric pressure. The heating and dispensing system has a dispensing means remotely disposed from the heating and storage tank for the liquids to be dispensed which are connected to each other by fluid flow conduits. The expansion module is operatively connected in the fluid flow conduits connecting the elements of the system for leading the liquid to be heated and dispensed from the source thereof to the point where the liquid is dispensed. The expansion module forms an expansion chamber and has a combined vent and overflow means at the upper section and an outlet port means at the lower section both in communication with the expansion chamber. The outlet port means connects with an aspirator means operatively connected to the fluid flow conduits for the system so that when liquid is dispensed by the system collected expansion liquid or backflow liquid in the expansion chamber will be withdrawn during operation of the system.

The expansion module also includes outflow cut-off means responsive to the level of the collected liquid in the expansion chamber such as a ball which operates to close the outlet port means when the liquid in the expansion chamber has been substantially emptied therefrom to prevent induction of air into the fluid flow conduits of the heating and dispensing system.

19 Claims, 10 Drawing Figures

PATENTED JUN 24 1975
3,891,124
SHEET 1
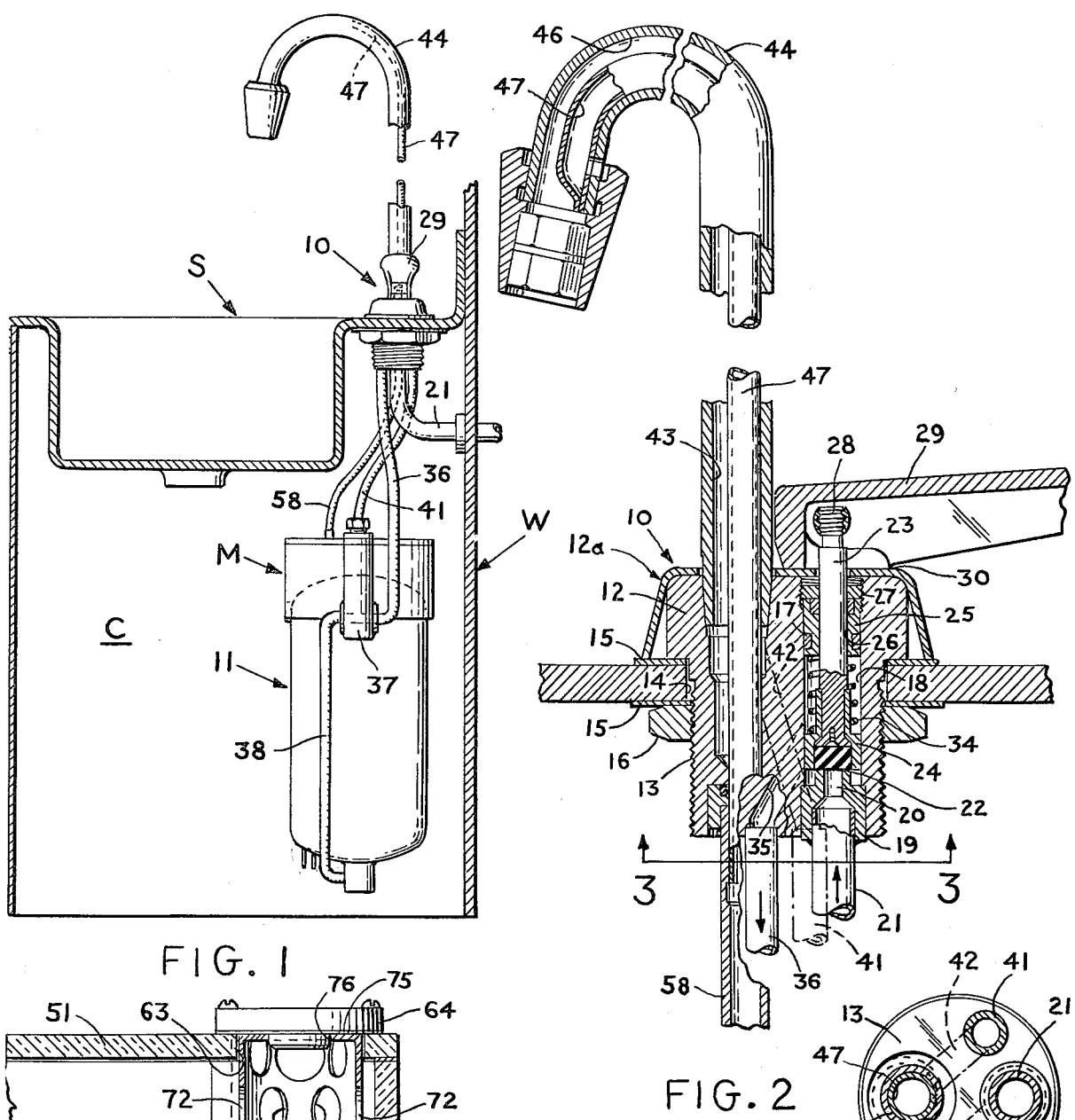
FIG. 1
FIG. 2
FIG. 3
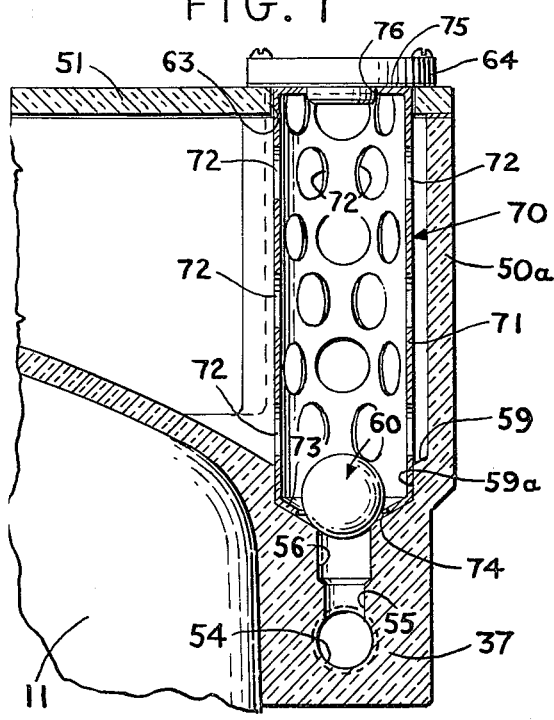
FIG. 9

MEANS FOR STORING AND DISPENSING HEATED LIQUID WITH EXPANSION CHAMBER MODULE AND SYSTEM THEREFOR

BACKGROUND OF THE INVENTION

This invention relates generally to apparatus and systems for heating and dispensing liquid such as water which operate at atmospheric pressure, and more particularly to an expansion module for such systems made preferably from plastic material for collecting expansion or backflow liquids from the system when it is not dispensing heated liquids and for returning or delivering the collected expansion or backflow liquids to the system when it is in operation.

Systems for heating and dispensing liquids such as water at atmospheric pressure have been developed particularly for serving instant beverages and soup. Operation of these systems at atmospheric pressure is particularly desirable because it avoids the expense of safety valves or pressure resistant construction in the vessels in which the liquids must be heated.

Examples of such systems are shown and described in U.S. Pat. Nos. 3,202,321 and 3,642,176.

In these systems, the dispensing of the heated liquid is accomplished by displacement thereof by incoming unheated liquid from a pressurized source such as a city water main, the flow of such unheated liquid being controlled by actuating a dispensing valve upstream from the heating and dispensing means for the system. As long as the dispensing valve is maintained open, heated fluid will be dispensed from the system by such displacement action.

After the dispensing valve is closed, the volume of the liquid in the system increases due to thermal expansion as its temperature is increased to the maximum predetermined value set for the system.

In the prior art devices, expansion spaces have been provided where expansion liquid could collect or accumulate to prevent dripping thereof from the discharge point for the system as such expansion occurs. The collected expansion or backflow liquid was then withdrawn into the main liquid flow stream by suitable aspiration means when liquid was again dispensed during operation of the system.

Since these systems operate at atmospheric pressures, the expansion chambers at all times were suitably vented to the atmosphere and in the more recent prior art devices such venting means formed the venting arrangement for the entire heating and venting system.

The prior art devices with such expansion means functioned effectively but permitted air to be drawn into the flow stream through the atmospheric vent when all the collected liquid had been emptied from the expansion chamber during operation of the system. This air in the heating and storage tank caused turbulence, delayed or interrupted flow, frequently reduced temperature of the liquid dispensed, and created an indeterminate expansion volume.

In applicant's copending application Ser. No. 352,972, filed Apr. 20, 1973, now U.S. Pat. No. 3,836,050 there is disclosed a remotely disposed dispensing head incorporating an expansion chamber and a float cut-off means operative to close the passage to the aspirator when the liquid surface in the expansion chamber has reached a predetermined minimum level for overcoming this problem of the prior art devices.

The present invention discloses still another means for overcoming these problems of the prior art in the form of an expansion module in which the functions of an expansion chamber, vent means, aspirating means and outflow cut-off means are combined in a single component made preferably and substantially completely of molded plastic material. Such expansion modules can be manufactured at substantial savings in cost over equipment constructed by the methods and materials of the prior art.

In addition, the expansion module in accordance with the present invention, provides better accessibility for servicing and cleaning, is easier to mount or install for locations where space restrictions do not permit the use of earlier forms of the equipment and in the preferred form, as hereinafter disclosed, may be molded to fit approximately to the top of the heating and storage means for the heating and dispensing system so that the expansion water may be maintained at a higher temperature by transfer of heat that may be otherwise lost from the heating and storage tank, thus conserving energy.

SUMMARY OF THE INVENTION

Thus, the present invention covers an expansion module for use in a liquid heating and dispensing system operating at atmospheric pressure including fluid flow conduits wherein the expansion module forms an expansion chamber for accumulating expansion or back flow liquid from the system. Combined overflow and vent means at the upper end of the expansion module connects the expansion chamber through conduit means to the atmosphere at a point above the sink drain where any over-expansion of liquid is automatically routed to waste. The expansion module is further provided with an outlet port means disposed at the lower section thereof which communicates at one end with the expansion chamber, an aspirator means on the expansion module communicates with the other end of the outlet port means and is operatively connected to the fluid flow conduits for liquid flowing and being dispensed in the heating and dispensing system so that during the dispensing of said liquid the aspirator will act to withdraw collected liquid from the expansion chamber through the outlet port means, and float means in the expansion chamber responsive to the level of collected fluid is disposed to close the outlet port means when the level of collected fluid in the expansion chamber reaches a predetermined minimum point.

The expansion module is preferably formed of plastic material and shaped to fit approximately to the top of the heating and storage tank for the liquid heating and dispensing system for convenient support of the module and for conservation of heat otherwise lost from the heating and storage tank.

Further, the expansion module may have divider means to form a separate float chamber, and passage means in said divider means will permit free passage of fluid from the expansion chamber to the float chamber and equalize the levels of liquid therein.

It is an object of the invention to provide an expansion module which is less expensive to manufacture and which will meet the same performance requirements as the prior art devices.

Another object of the invention is to provide an expansion module which can be installed easily without requiring additional points of support.

A further object of the present invention is to facilitate access to the elements of the expansion module for servicing and cleaning or replacement.

Another object of this invention is to provide an expansion chamber in which the expansion liquid will be maintained at elevated temperature by heat which would otherwise be lost from the heating and storage tank to the surroundings.

These and other objects of the invention will be clear to those skilled in the art from the following description, when considered in connection with the annexed drawings, in which:

FIG. 1 is a side elevational view of a dispensing system for heated liquid mounted in a sink cabinet, with a fragment of the heating and storage means and the expansion module shown in partial section.

FIG. 2 is an enlarged view in vertical section of the dispensing head for the form of hot water dispensing system shown in FIG. 1.

FIG. 3 is a cross section taken on line 3—3 of FIG. 2.

FIG. 9 is an enlarged vertical section through the port means of an expansion module showing a removable alternate form of divider means of the invention.

Figure 4:
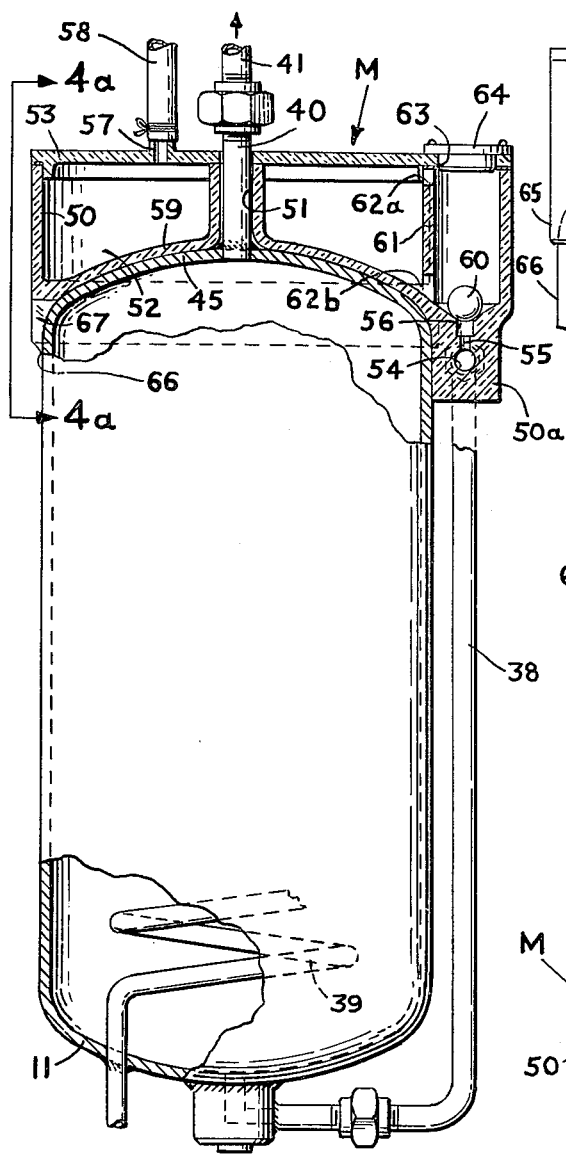
FIG. 4 is a front elevation view of a heating and storage tank and expansion module, with the expansion module and upper portion of the tank in vertical section and the lower part of the tank partly broken away.
Figure 6:
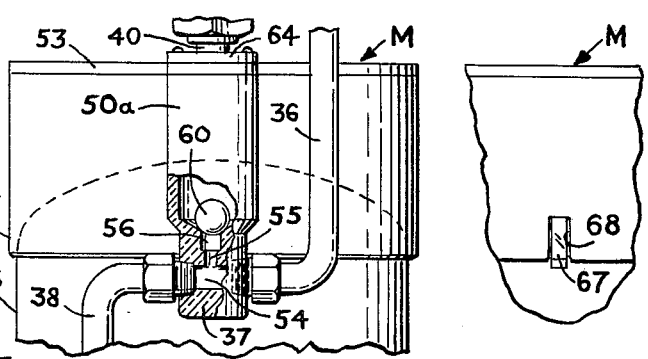
FIG. 6 is a top view of the expansion module of FIG. 4 with a portion of the cover broken away.
Figure 4A:
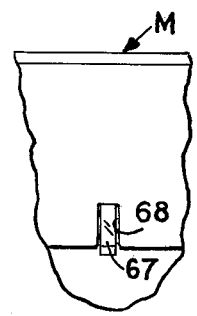
FIG. 4a is a partial side elevation view of an expansion module and a heating and storage tank showing the lug and mating slot to hold angular relationship between module and tank.

Referring now to the drawings, FIG. 1 shows an installation of a liquid heating and dispensing system of the atmospheric pressure type to which the present invention pertains. The system as illustrated is installed in a commode generally designated C and the heated liquid is dispensed over a sink S which forms the top of the commode. The major assemblies of the system are, first, the dispensing means generally designated 10 mounted adjacent to the sink S, second, the liquid heating and storage means generally designated 11 which may be mounted on a vertical wall W within the commode, and third, the expansion module generally designated M which is preferably mounted on the top of the liquid heating and storage means to simplify installation requirements, conserve heat otherwise lost from the top of the heating and storage means to the surroundings, and reduce piping costs to a minimum.

These three major assemblies are connected to each other by conduit means as will be more fully described hereinafter.

While the expansion module M is shown in the preferred form of the invention as being mounted on the heating and storage means 11, it will be understood by those skilled in the art that the expansion module M may be connected independently of this element or any other element of the system except that it must be at an elevation or point higher than that of the upper level of fluid in the heating and storage means and must communicate with the fluid flow lines connected to the heating and storage means 11, either those lines for delivering incoming fluid or those lines delivering the heated fluid being passed to the dispensing means for the system.

In FIG. 2, the dispensing means 10 is shown as including a generally cylindrical body 12 having a threaded section 13 of smaller diameter which extends through an opening as at 14 in the upper horizontal surface of the sink S and permits the body to be secured and sealed in place by suitable seal means 15 and retaining nut 16. A finished cover piece 12a made of stainless steel fits over the cylindrical body 12.

The body 12 of the dispensing means 10 is provided with a control valve generally designated 17 which operates in a longitudinal bore 18 in the body.

At its lower end, bore 18 is closed by a fitting 19 having an inlet passage 20 therethrough. At its lower end, the inlet communicates with a supply conduit 21 through which liquid is conducted to the system from the pressurized source (not shown) which liquid will be at existing supply-line temperature.

Inlet passage 20 terminates in a valve seat 22 which projects from the upper end of the fitting 19.

A valve stem 23 having a valve head 24 is slidably mounted in the longitudinal bore 18 and will engage the inlet passage 20 so as to maintain the inlet passage normally closed by engagement with the valve seat 22 formed on the fitting 19.

Valve stem 23 extends through the bore 18 in the body 12 passing through an opening 25 formed in a packing means 26 which is held in assembled position by a closure member 27 and the end of the valve stem 23 remote from the valve head 24 is connected by any suitable means 28 to a lever arm 29 which is pivoted as at 30 on the upper face of the finished cover piece 12a.

The valve head is maintained in its normally closed position by a spring means 34 which is disposed about the valve stem 23 so that it engages the valve head 24 at one end and the packing element 26 at the end remote therefrom thus lying between these two elements. Since the packing element 26 is fixed the spring 34 will urge the valve head 24 and the valve stem so as to cause the valve head 24 to engage the valve seat 22 as is shown in FIG. 2 of the drawings.

When manual pressure is exerted on the lever arm 29 so it pivots about the pivot member 30, it will cause the valve stem connected thereto to lift the valve head 24 off of the valve seat 22 and thus open the inlet passage 20 and simultaneously will compress the spring 34 as long as the lever arm 29 is held in the depressed position.

When the valve head 24 is released from the seat 22 fluid will flow through the inlet passage 20 into the longitudinal bore 18 so long as the lever arm 29 is maintained depressed and when the lever arm 29 is released the spring 34 will return the valve head to its normally closed position all of which is shown in FIG. 2 of the drawings.

FIG. 2 further shows that the longitudinal bore communicates with a cross over passage 35 which is connected to the inlet or lead-in conduit 36 which communicates at the remote end with an aspirating member 37 formed in the expansion module M.

The aspirating member 37 in turn communicates with a conduit 38 which is connected at the end remote from the aspirating member to the bottom of a liquid heating and storage tank 39 in the liquid heating and storage means 11, for passing the incoming fluid to said tank 11.

It will be understood by those skilled in the art that while the aspirator member 37 is shown in communication with the conduit 38 for incoming fluid that the aspirator may alternatively be connected in operative association with the outlet conduit 40 connected at one end to a fitting 41 at the upper end of the heating and storage tank 39 and at the end remote therefrom to dispensing means 10, more fully described hereinafter, for passing heated liquid to the dispensing means, without departing from the scope of the present invention.

An electric heater element 39 disposed in the lower section of the heating and storage tank 11 for heating liquid delivered thereto is connected to a source of electric current through thermostatic control means (not shown) responsive to the temperature of liquid in the heating and storage tank 11, as shown in FIG. 4.

The circuitry for storage tank and the means for calibrating and establishing the heating temperature for the liquid in the heating and storage tank 11 are so well known as not to require any further description as will be clear from U.S. Pat. Nos. 3,202,321 and 3,642,176.

The expansion module may be molded or formed from any suitable plastic material such as Acrylonitrile-Butadiene-Styrene; sold under the trademark CYCOLAC, Polybutylene Terephthalate, sold under the trademark CELANEX, acetals sold under the trademark DELRIN and acetal copolymers sold under the trademark CELCON. Other materials or plastics which are inert may also be used to form the expansion module. It will, of course, be understood by those skilled in the art that the expansion module can be made of conventional corrosion resistant alloys such as cupronickle alloys, brass, aluminum alloys, tec.

EXPANSION MODULE

As shown in FIGS. 1 and 4, the expansion module M is a generally cylindrical member having a lower body section as at 50 forming an annular cavity which when closed by a mating cover member 53 will form the expansion chamber 52.

In the manufacture of an expansion module in accordance with the present invention from suitable plastic materials the mating cover member 53 can be ultrasonically welded to lower body section 50 to provide the fluid tight expansion chamber 52. This is a well known technique for the fabrication of plastic parts and therefore will not be more fully described herein.

The lower section 50 is contoured to fit approximately and to be supported by the upper end 45 of the heating and storage tank element so that a longitudinal opening 51 through the center of the expansion module will provide clearance for the outlet fitting 40 which extends upward from the upper end 45 of the heating and storage tank 11.

Centrally disposed in the upper end 45 of the heating and storage tank 11 is an outlet fitting 40 connected to an outlet conduit 41, which communicates at its remote end with a second cross-over passage 42 in the body 12 of the dispensing means 10. As FIGS. 2 and 3 show, the second cross-overpassage connects at its end remote from conduit 41 with a second longitudinal bore 43 in the body 12, in the upper end of which a discharge spout 44 is fitted so as to be adjustable in angular position on the body 12. The discharge spout 44 has a main bore 46 to conduct hot liquid to the point of use, and a parallel independent overflow and vent passage 47 which will be more completely described hereinafter.

The plastic body 50 has a boss 54 overhanging one side of the liquid heating and storage tank 39 which lies below the plane of the expansion chamber 52. The aspirating member 37 is formed in the boss by a T-shape passage means having a straight section 54 and a suction port 55 communicating with the straight section. The upstream side of the straight section 54 is connected to the end of conduit 36 and the downstream side to the end of the conduit 38 as above described.

Suction port 55 of the aspirating member 37 communicates with a conical outlet port 56 at the lowest point of the expansion chamber 52, thus providing free passage for the liquid in the heating and storage tank 39 being heated to expand through conduit 38, aspirating member 37, suction port 55 and outlet port 56 into the expansion chamber 52.

Atmospheric pressure is maintained in the expansion chamber by a vent fitting 57 in the cover member 53 communicating by vent conduit 58 with vent passage 47 where it terminated in the body 12. Since the expansion chamber communicates freely with the heating and dispensing system it will also serve to vent the entire heating and dispensing system to atmosphere at all times. Further, if the dispensing of heated water is obstructively terminated, back flow may result and this liquid can pass to the expansion chamber 52 and be discharged from the system through the vent chamber 58 and vent passage 47 as will be explained more fully hereinafter.

OUTFLOW CUT-OFF

Figure 5:
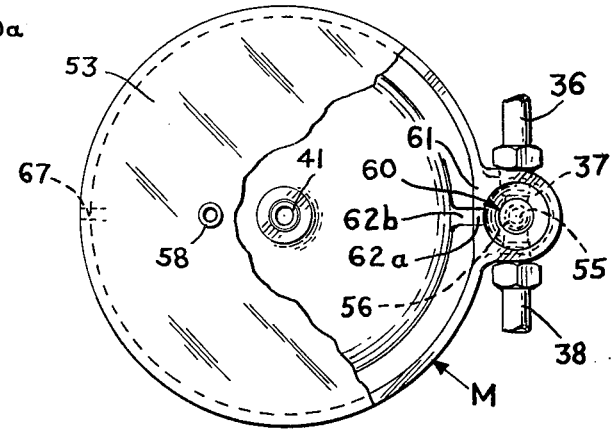
FIG. 5 is a top view of an expansion module and the upper portion of a supporting heating and storage tank, with a portion of the expansion module in horizontal section to show the aspirator means and port means.

Referring again to FIGS. 4 and 5, the bottom wall 59 of the expansion chamber 52 is formed so as to slope from all points downward to the outlet port 56, permitting complete drainage of liquid to the outlet port. Induction of air from the vent into the flowing liquid, through the action of the aspirating member 37, is prevented by a floating plug member such as ball 60 formed of any suitable material to be lighter than the liquid and inert in contact therewith. The ball 60 floats in the liquid which is in the expansion chamber 52 and offers no interference with flow of liquid in or out of the expansion chamber until the expansion chamber is nearly emptied. The ball 60 then contacts the conical utlet port 56 to prevent further outward flow from the expansion chamber.

The ball 60 is confined to the region above the outlet port 56 by a divider 61 formed in the plastic body 50 having balancing passages 62a and 62b therethrough to equalize liquid levels and maintain atmospheric pressure on both sides. The individual balancing passages have a minimum dimension smaller than the diameter of the ball 60. Access to the ball 60 and the outlet port 56 may be provided by an access opening 63 in the cover member 53, normally closed by a removable leak-tight closure member 64.

The expansion module M is maintained in its proper position on the heating and storage tank 11 by a flange 65 projecting downward from the plastic body 50 so as to slidably engage the upper side surface 66 of the heating and storage tank. A projecting lug 67 is raised on the surface 66 to mesh as keying means with a slot 68 in the flange 65 to locate the expansion module M correctly on the heating and storage tank 11 and to resist the torque of tightening threaded connections.

OPERATION

In operation, heated liquid is dispensed from the system by admitting fresh liquid from the supply source to displace an equal volume of heated liquid from the heating and storage tank to the discharge spout.

Referring to FIGS. 1, 2 and 4 of the drawings, the supply liquid is admitted by manually depressing the lever arm 29 to lift the valve head 24 from its closed position against the valve seat 22, as has been previously described. The supply liquid flows through supply conduit 21 and inlet passage 20 into the longitudinal bore 18, then through the first cross-over passage 35 and conduit 36 to the aspirating member 37 in the plastic body 50 of the expansion module M. The liquid passages of the aspirating member are so designed that the liquid admitted to the system by the control volve 17 flows out of the aspirating member 37 through conduit 38 to the heating and storage tank 11, at the same time aspirating any collected liquid in the expansion chamber 52 through suction port 55 into the stream of liquid flowing to the heating and storage tank.

As incoming liquid enters the tank at the bottom, an equal volume of liquid already heated is discharged from the top of the tank through outlet fitting 40 and outlet conduit 41 to second cross-over passage 42 in the body 12 of the dispensing means, through second longidutinal bore 43 and main bore 46 of the discharge spout 44.

When sufficient liquid has been dispensed, the lever arm 29 is released and spring 34 returns valve head 24 to its position against valve seat 22, stopping the flow of liquid up to the crest of the main bore 46 in discharge spout 44, which is open to atmosphere.

The system is also vented through the aspirating member 37, balancing passages βa and 62b and expansion chamber 52 to vent fitting 57, vent conduit 58 and vent passages 47 in the discharge spout to atmosphere as may be seen in FIG. 2. Thus, when the control valve 17 is closed to stop the flow of incoming liquid, the liquid passages connecting the two vented locations act like an open U-tube, that is, liquid flows back by gravity from the crest of discharge spout main bore 46 toward heating and storage tank 11, and from the tank through conduit 38, aspirating member 37, suction port 55 and outlet port 56 into expansion chamber 52 until the liquid surfaces are at the same level.

At the same time, the unheated liquid admitted to the heating and storage tank 11 from the supply source will lower the temperature in the tank and actuate the thermostat to energize the electric heater element 39. As the liquid temperature rises, the volume of liquid increases, which may amount to several percent for water and more for certain other liquids. This expansion volume also causes some gradual flow into the expansion chamber until the desired temperature is reached in the tank and expansion ceases.

In the event of malfunction which might cause the expansion chamber 52 to fill completely with liquid to an overflow condition, the excess liquid may escape through the vent system, being discharged into the sink S where drainage is available without causing damage. Such continuing discharge of liquid when not called for will indicate the presence of the malfunction.

The liquid accumulated in the expansion chamber 52 is returned to the main dispensing system when liquid is again dispensed and incoming fluid flows through the aspirating member 37 of the expansion module M as above described. Liquid is withdrawn from the expansion chamber by gravity flow through balancing passages 62a and 62b in the divider 61 to outlet port 56 and suction port 55 of the aspirating member, and is drawn into the main flow stream and mixed with incoming liquid by aspirating action. It is heated to the desired temperature before being dispensed, and in the preferred form the heat required is minimized by mounting the entire expansion module in close-fitted relationship on top of the heating and storage tank 11 so that heat otherwise lost to the surroundings from the top of the tank serves first to warm the liquid in the expansion chamber.

Mixing of air with the liquid has been found to cause delay in flow of the liquid to be dispensed, temperatures lower than desired, and an indeterminate expansion volume in the heating and storage tank 11. The expansion module of the present invention avoids such disadvantages by outflow cut-off means such as the floating ball 60 shown in FIGS. 4, 5, 8 and 9. The ball rises to permit expansion or overflow liquid to flow through aspirating member 37, outlet port 56 into the expansion chamber 52, and also permits outward flow by aspirating action until the liquid level drops to the outlet port 56 and the ball seats in continuous peripheral contact with the outlet port before air is drawn into the aspirating member.

Figure 7:
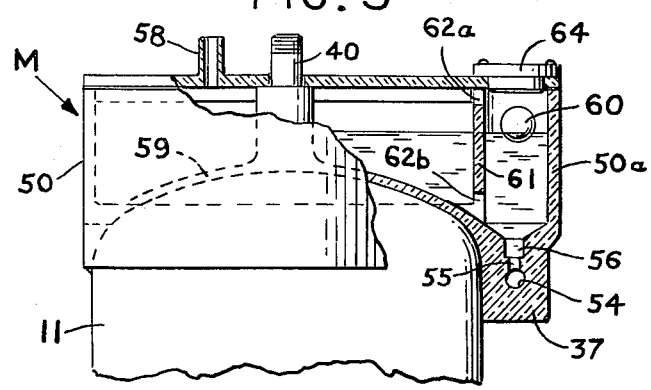
FIG. 7 is a side elevation view corresponding to the upper part of FIG. 4 with the expansion module partly in vertical section to show expansion liquid partly filling the expansion chamber of the module.
Figure 8:
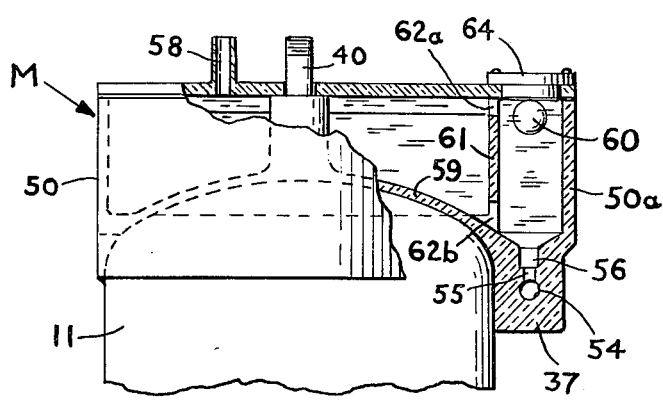
FIG. 8 is a side elevation view corresponding to FIG. 7 with expansion liquid completely filling the expansion module and overflowing through the vent means to the discharge opening in the spout.

The ball then has the position shown in FIG. 4. With some expansion liquid in the expansion chamber, the ball floats at the surface as shown in FIG. 7 but is confined to the general vicinity of the outlet port 56 by the divider 61, in which balancing passages 62a and 62b equalize the liquid levels and air pressure on both sides. FIG. 8 shows the overflow condition with liquid filling the expansion chamber. The ball 60 is at the top of the chamber but remains ready to perform its intended function as soon as required by a return to normal condition.

Obviously, other float shapes and outflow cutoff configurations could be used, such as conical float members, as are well known in the art.

Further, as shown in FIG. 9, the float member may be confined by a removable divider in the form of a separate basket or screen 70. The basket 70 may be molded of plastic with a cylindrical shell 71 with perforations 72 to permit ready passage of fluid, while confining the float member. The basket 70 is formed with a bottom lip 73 contoured to fit the recess 592 in the bottom wall 59 of the module body 50, leaving an opening 74 smaller than the largest diameter of the float member or ball 60, but large enough to avoid contact with the float member when it is seated on the outlet port 56. The basket 70 has an inward extending upper lip 75 at its upper end, leaving an upper opening 76 therein of diameter larger than the largest diameter of the float member 60, whereby the float member 60 can readily be removed from the module M through the access opening 63 in the cover member 51 by removing the basket 70. The outer diameter of the basket 70 is made slightly smaller at the top than the inner diameter of the access opening 63, and the height of the basket is selected to provide a small clearance with the closure member 64 on the access opening 63 when assembled.

Similarly the aspirating member can be connected in the flow passage conducting heated liquid from the top of the heating and storage tank to the body 12 of the dispensing means.

While the expansion module has been shown and described as an independent element it will be understood that it can be joined or made part of the heating and storage tank as shown for example in U.S. Pat. No. 3,642,176. Such an arrangement would be particularly adaptable to a composite all plastic heating, storage tank and expansion module.

It will be understood that the invention is not to be limited to the specific construction or arrangement of parts shown but that they may be widely modified within the scope of the invention defined by the claims.

What is claimed is:

1. An expansion module made for use in a liquid heating and dispensing system operating at atmospheric pressure comprising:
   a. means forming an expansion chamber for accumulating expansion and backflow liquid from the heating and dispensing system,
   b. a combined overflow and vent means on said expansion module communicating at one end with said expansion chamber and at the end remote therefrom open to atmosphere,
   c. outlet port means disposed at the lower section of the expansion module communicating at one end with the expansion chamber,
   d. aspirator means on said expansion module communicating with the other end of said port means, and having an inlet, and an outlet,
   e. said aspirator means having said inlet and outlet operatively connected to the heating and dispensing system whereby on dispensing of heated liquid from the system the aspirator means will withdraw collected expansion and backflow liquid from the expansion chamber, and
   f. outflow cut-off means responsive to the level of collected liquid in the expansion chamber operative to close the outlet port means when the level of the liquid in the expansion chamber drops to a predetermined minimum level.

2. In an expansion module as claimed in claim 1 including, divider means for forming a separate float chamber, and said out flow cut-off means disposed in said float chamber.

3. In an expansion module as claimed in claim 1 wherein, the expansion chamber is formed by an annular cavity and said expansion module has a longitudinally disposed opening centrally of said annular cavity.

4. An expansion module for use in a liquid heating and dispensing system operating at atmospheric pressure and having a liquid flow path therein comprising:
   a. a plastic body forming an expansion chamber to collect overflow and expansion liquid from the liquid heating and dispensing system,
   b. said plastic body having port means at substantially the lowermost point of the expansion chamber,
   c. aspirator means in said plastic body having an inlet, an outlet, and a suction opening, the inlet and outlet connectible into the liquid flow path of the system and the suction opening communicating with the port means,
   d. combined overflow and vent means in the top of the expansion chamber,
   e. outflow cut-off means responsive to the level of collected liquid in the expansion chamber, operatively disposed to close said port means to further withdrawal of collected liquid from the expansion chamber when the surface thereof drops to a predetermined level, to prevent air from being drawn into the liquid flow path of the system from the vent means.

5. In an expansion module as claimed in claim 4 wherein the plastic body has passage means communicating between the port means and the suction opening of the aspirator means to conduct the expansion liquid to and from the expansion chamber.

6. In an expansion module as claimed in claim 4 wherein the plastic body is formed from a material selected from the group: Acrylonitrile-Butadiene-Styrene, Polybutylene Terephthalate, Acetals and Acetal copolymers.

7. In expansion module as claimed in claim 4 wherein the plastic body is formed by molding.

8. In an expansion module as claimed in claim 4 wherein,
   a. the plastic body has at least a portion of its bottom surface contoured to operatively fit in assembled position in the heating and storage system and be removably supported thereby,
   b. flange means projecting downward from the bottom surface of the plastic body, and
   c. a vertical opening through the plastic body.

9. In an expansion module as claimed in claim 8 wherein the plastic body has keying means to maintain the angular relationship of the expansion module in assembled position.

10. In an expansion module as claimed in claim 4 wherein;
   a. the outflow means comprises, a plug member formed as a body of revolution lighter in weight than an equal volume of the liquid in the expansion chamber and with at least its surface formed of a material inert to the liquid,
   b. said plug member floats with its axis vertical at the surface of the liquid in the expansion chamber and closes the port means when the liquid in the expansion chamber has been withdrawn substantially to the level of the port means.

11. In an expansion module as claimed in claim 4 wherein,
   a. the plastic body has divider means separating a portion of the expansion chamber in the vicinity of the port means from the remainder of the expansion chamber so as to retain the outflow cut-off means in position to contact the port means in sealing relationship when the liquid is substantially emptied from the expansion chamber through the port means, and
   b. said divider means having openings to permit liquid to pass freely from one side of the divider means to the other side to equalize the liquid levels on opposite sides thereof, c. said plastic body has an access opening through its upper surface in the area above the port means, and d. the expansion module includes, cover means removably attached to the plastic body to close the access opening in fluid-tight relationship.

12. In an expansion module as claimed in claim 11 wherein, a. the divider means is a removable member insertable through the access opening, b. said divider means having an opening in the bottom surface smaller than the maximum diameter of the plug member and large enough to prevent contact with the plug member when the plug member is in the seated position on the port means, whereby the plug member may be extracted from the expansion chamber by removal of the divider means to facilitate inspection and servicing.

13. In an expansion module as claimed in claim 11 wherein, the plug member is a ball larger in diameter than the port means.

14. In a liquid heating and dispensing system operating at atmospheric pressure, a. means for heating and storing liquid, b. dispensing means, c. conduit means for liquids connecting said heating and storage means to the dispensing means and to an inlet for the systems communicating with a source of liquid to be heated, d. means operatively associated with the fluid flow conduits to control the delivery of liquid to be heated from the source to the heating and storage means whereby heated fluid will be dispensed therefrom through the conduit means to the dispensing means, and, e. an expansion module operatively connected to the conduit means for liquids flowing in the heating and dispensing system comprising:

1. means forming an expansion chamber for accumulating expansion and backflow liquid from the heating and dispensing system, 2. a combined overflow and vent means on said expansion module communicating at one end with said expansion chamber and at the end remote therefrom with the dispensing means, 3. outlet port means disposed at the lower section of the expansion module communicating at one end with the expansion chamber, 4. aspirating means on said expansion module communicating with the other end of said outlet port means, and having an inlet and an outlet and said inlet and outlet operatively connected in the conduit means whereby on dispensing of heated fluid from the system the aspirator means will withdraw collected expansion and backflow liquid from the expansion chamber, and 5. outflow cut-off means responsive to the level of collected liquid in the expansion chamber operative to close the outlet port means when the level of the fluid in the expansion chamber drops to a predetermined minimum level.

15. In 2 liquid heating and dispensing system as claimed in claim 14 wherein the expansion module includes, a. divider means for forming a separate float section, and b. said outflow cut-off means is disposed in said float section.

16. In a liquid heating and dispensing system as claimed in claim 14 wherein, a. conduit means for connecting the heating and storage means to the dispensing means is disposed centrally of the upper section of the heating and storage means, b. said expansion module is shaped to closely fit the top of the heating and storage means about said conduit means, and c. the expansion module is detachably connected to the heating and storage means.

17. In a liquid heating and dispensing system as claimed in claim 14 wherein, a. the expansion module forms the expansion chamber in the form of an annular cavity and, b. said expansion module has a longitudinally disposed opening centrally of said annular cavity.

18. In a liquid heating and dispensing system as claimed in claim 14 wherein, a. the combined overflow and vent means is an independent conduit means operatively connected to the dispensing means, and b. said conduit having a vent outlet opening to atmosphere near the point of discharge for said dispensing means.

19. In a liquid heating and dispensing system as claimed in claim 14 wherein, a. said expansion module has at least a portion of its bottom surface contoured to match the shape of the top of the liquid heating and storage means and disposed to be removably supported thereon, b. flange means about the bottom of the expansion module to engage about the upper end of the heating and storage means, c. a first keying means in the expansion module and d. a second keying means at the upper end of the heating and storage means to mate with said first keying means for maintaining the expansion module in assembled position on the heating and storage means.

* * * * *